United States Patent
Shimizu et al.

(10) Patent No.: US 6,464,738 B1
(45) Date of Patent: Oct. 15, 2002

(54) FABRICATION METHOD OF SOLID ELECTROLYTIC CAPACITOR

(75) Inventors: Kunihiko Shimizu, Tokyo (JP); Katsuhiro Yoshida, Tokyo (JP); Toshihiko Nishiyama, Tokyo (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 09/676,532

(22) Filed: Oct. 2, 2000

(30) Foreign Application Priority Data

Nov. 19, 1999 (JP) ........................................... 10/330201

(51) Int. Cl.⁷ .............................. H01G 9/00; H01G 9/02
(52) U.S. Cl. ....................... 29/25.03; 361/523; 361/525
(58) Field of Search ............................ 29/25.01–25.03; 361/523–526, 528–529, 538, 540; 429/30–33, 191, 192, 198; 252/62.2

(56) References Cited

U.S. PATENT DOCUMENTS

| 4,934,033 A | * | 6/1990 | Harakawa et al. | ......... 29/25.03 |
| 6,042,740 A | * | 3/2000 | Uehara et al. | ............. 252/62.2 |
| 6,110,235 A | * | 8/2000 | Araki et al. | ................ 29/25.03 |
| 6,168,639 B1 | * | 1/2001 | Taketani et al. | ........... 29/25.03 |

FOREIGN PATENT DOCUMENTS

JP     11-87187     3/1999

* cited by examiner

*Primary Examiner*—Ha Nguyen
(74) *Attorney, Agent, or Firm*—McGinn & Gibb, PLLC

(57) ABSTRACT

On the porous surface of valve metal, an anodically-oxide film of the valve metal is formed and, after that, a conducting polymer layer is formed on the oxide film. Subsequently, the conducting polymer layer is dried and, after that, the anodically-oxide film of the valve metal is reformed. As mentioned above, the water content in the conducting polymer layer is reduced by drying and, after that, the anodically-oxide film of the valve metal is reformed, so that a peroxidative reaction with moisture in the conducting polymer layer in the reformation can be suppressed and an excessive insulation of the conducting polymer layer can be prevented. Consequently, there can be obtained a solid electrolytic capacitor in which an increase in equivalent series resistance is prevented and the conducting polymer layer is made of a solid electrolyte.

11 Claims, 4 Drawing Sheets

FABRICATION METHOD OF SOLID ELECTROLYTIC CAPACITOR

BACKGROUND OF THE INVENTION (i) Field of the Invention

The present invention relates to a fabrication method of a solid electrolytic capacitor and, more particularly, to a fabrication technique that is effective in decreasing both of a leakage current and an equivalent series resistance in a solid electrolytic capacitor using a conducting polymer as a solid electrolyte.

(ii) Description of the Related Art

In a solid electrolytic capacitor obtained in such a manner that a solid electrolyte is formed on a dielectric film obtained by anodically oxidizing valve metal such as tantalum or aluminum, recently, a conducting polymer such as polypyrrole, polythiophene, or polyaniline is used as a solid electrolyte in many cases. The conducting polymer has an equivalent series resistance (ESR) that is lower than that of manganese dioxide used popularly as a solid electrolyte so far, and is excellent in characteristics in high-frequency regions.

The solid electrolytic capacitor using the conducting polymer is a capacitor that has a low ESR and is excellent in characteristics in the high-frequency regions. On the other hand, however, has been known such a fact that the leakage current is relatively higher than that of the conventional solid electrolytic capacitor using manganese dioxide. Hitherto, to improve such leakage current characteristics, for example, in a technique disclosed in Japanese Patent Application Laid-Open Publication No. 11-087187/1999, after the solid electrolyte of the conducting polymer is formed on the dielectric film by a chemical polymerization, the dielectric film is subjected to an anodic reoxidation (hereinbelow, referred to as a reformation). It is considered that the reformation heals defective portions of the dielectric film to reduce the leakage current.

A fabrication method of a tantalum solid electrolytic capacitor disclosed in the above-mentioned Publication will now be described with reference to FIGS. 1 and 2A and 2B. The fabrication method of the solid electrolytic capacitor in which the solid electrolyte of the conducting polymer is formed on the dielectric film and, after that, the dielectric film is reformed will now be explained by using a tantalum solid electrolytic capacitor as an example.

FIG. 1 is a flowchart showing a fabrication process of the tantalum solid electrolytic capacitor having a reforming step in accordance with the order of processing steps. FIG. 2A is a cross-sectional view of a capacitor element at the point of time when the processes up to the formation of a conducting polymer layer in the fabrication of the tantalum solid electrolytic capacitor are finished. FIG. 2B is a schematic view for explaining a forming method.

First, fine powder of metal tantalum is pressed to be molded into a cylindrical or prismatic form. The molded article is sintered, thereby obtaining a micro-porous sintered body 1 (step S10). At that time, a tantalum wire 2 is prepared before the molding. The tantalum wire 2 is set into one plane of the molded article upon molding.

Subsequently, as shown in FIG. 2B, the sintered body 1 is immersed in a forming solution 7 such as an aqueous solution of phosphoric acid. A high-order potential is applied to the tantalum wire 2 of the sintered body 1 and a low-order potential is applied to an opposite electrode 5 to perform an anodic formation, thereby forming a tantalum oxide film 3 as a dielectric on the surface of the micro-porous surface of the sintered body 1 (step S20). The sinter 1 on which the tantalum oxide film 3 has been formed will be called a formation, hereinbelow.

Performing a chemically-oxidative polymerization forms a polypyrrole layer 4 as a conducting polymer layer on the tantalum oxide film 3 of the foregoing formation (step S30).

After that, in a manner similar to the above-mentioned forming process (step S20), the tantalum oxide film 3 is reformed (step S40). The thickness of the polypyrrole layer 4 is adjusted to a predetermined thickness by repeating the steps S30 and S40 several times.

Due to the reformation in step S40, defective portions in the tantalum oxide film 3 as a dielectric are oxidized so as to be healed, and the polypyrrole layer 4 in the portion corresponding to a path for a current during the reformation is partially oxidized to become an insulator. Accordingly, a leakage current (LC) in the case where the article is used as a capacitor is reduced.

After that, a graphite layer and a silver paste are formed so as to be laminated on the polypyrrole layer 4 in accordance with this order to provide a cathode conductive layer (not shown) (step S50). Subsequently, an external cathode terminal is fixed to the cathode conductive layer by a conductive adhesive and an external anode terminal is fixed to the tantalum wire 2 by welding, so that the two external terminals of the cathode and anode are attached (step S60). After that, the resultant article is sheathed by a transfer molding process using an epoxy resin (step S70), so that the tantalum solid electrolytic capacitor is completed.

Ordinarily, when the tantalum oxide film as a dielectric is reformed, the conductive polymer layer is formed due to the chemically-oxidative polymerization in order to prevent the forming solution from becoming dirty and, after that, the layer is cleaned by using water or alcohol. Although an alcohol cleaning is effective, the cost of chemical is high. Accordingly, a water washing is generally performed. Therefore, it is thinkable that the conducting polymer layer before the reformation contains moisture during water washing. When the conducting polymer layer is formed by the chemically-oxidative polymerization and, after that, a conducting polymer layer is thickly applied on the above layer by an electrolytic polymerization, moisture is also trapped in the conducting polymer layers.

The inventors of the present invention found that as a problem in the case where the reformation was performed without removing the trapped moisture, the equivalent series resistance ESR of the capacitor was raised.

SUMMARY OF THE INVENTION

It is, therefore, an object of the present invention to provide a fabrication method of a solid electrolytic capacitor, comprising a step of performing a reformation after the formation of a conducting polymer layer, wherein an equivalent series resistance is not deteriorated due to the reformation.

According to the present invention, the fabrication method of the solid electrolytic capacitor is characterized in that the conducting polymer layer is dried before the reforming step to decrease moisture in the conducting polymer layer to a predetermined amount and, after that, an oxide film made of valve metal is reformed.

According to the present invention, after the conducting polymer layer is formed on the oxide film of the valve metal, the moisture in the conducting polymer layer is decreased to a predetermined amount. Consequently, it is possible to suppress such a phenomenon that the conducting polymer layer is reacted with water in the conducting polymer layer by a voltage that is applied to the conducting polymer layer at the time when the oxide film of the valve metal is reformed, so that the polymer layer is excessively insulated, and it is possible to prevent an increase in equivalent series resistance of the solid electrolytic capacitor. According to the present invention, simultaneously with the prevention of the increase in equivalent series resistance of the solid electrolytic capacitor, in a manner similar to the related art, the leakage current in the solid electrolytic capacitor can be also reduced.

DETAILED DESCRIPTION OF THE PREFERRED EMBODIMENT

An embodiment of the present invention will now be explained with reference to FIG. 3. First, fine powder of metal tantalum is pressed to be molded into a cylindrical or prismatic form. The molded article is sintered, thereby obtaining the micro-porous sintered body 1 (step S10). At that time, the tantalum wire 2 is prepared before the molding. The tantalum wire 2 is set into one plane of the molded article upon molding.

Figure 4A:
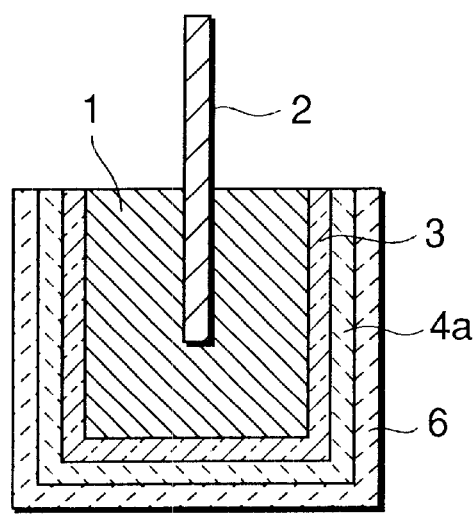
FIG. 4A is a cross-sectional view showing a capacitor element at the point of time when processes up to the formation of a conducting polymer layer in the fabrication of the tantalum solid electrolytic capacitor according to the present invention are finished.
Figure 4B:
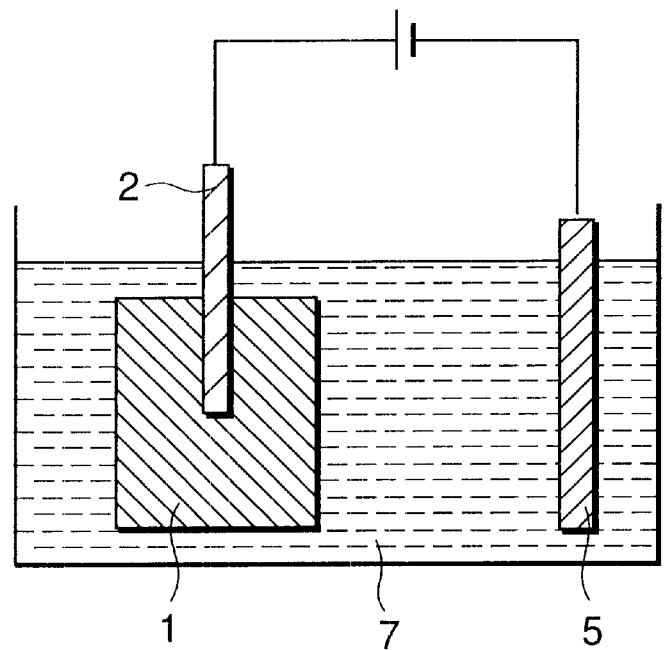
FIG. 4B is a schematic diagram for explaining a method of anodically forming the capacitor element shown in FIG. 4A.

Subsequently, as shown in FIG. 4B, the sintered body 1 is immersed in the forming solution 7 such as an aqueous solution of phosphoric acid. A high order potential is applied to the tantalum wire 2 of the sintered body 1 and a low-order potential is applied to the opposite electrode 5 to perform the anodic formation, thereby forming the tantalum oxide film 3 as a dielectric on the surface of the micro-porous surface of the sintered body 1 (step S20). The sinter 1 on which the tantalum oxide film 3 has been formed will be called a formation, hereinbelow.

The chemically-oxidative polymerization forms a conducting polymer layer (precoating layer 4a) of polypyrrole, polythiophene, or a derivative thereof on the tantalum oxide film 3 of the foregoing formation (step S31). The precoating layer 4a is used as a conductor to electrolytically polymerize the conducting polymer layer on the tantalum oxide film 3 as a dielectric.

After that, in a manner similar to the foregoing forming process (step S20), the tantalum oxide film 3 is reformed (step S40).

Subsequently, a conducting polymer layer 6 of polypyrrole is formed on the precoating layer 4a as a dielectric by the electrolytic polymerization and it is washed with water (step S41).

The conducting polymer layer 6 is dried by heating, vacuum drying, or leaving in the air (step S42). The drying process allows moisture in the conducting polymer layer 6 to be evaporated so that the water content is set to about 0.1 to 3 wt %. After that, in a manner similar to step S40, the tantalum oxide film 3 is reformed (step S43).

After that, due to the conventional well-known method, for example, a graphite layer and a silver paste are formed so as to be laminated on the conducting polymer layer 6 in accordance with this order to form a cathode conductive layer (not shown) (step S50). Subsequently, an external cathode terminal is fixed to the cathode conductive layer by a conductive adhesive and an external anode terminal is fixed to the tantalum wire 2 by welding, so that the two external terminals of the cathode and anode are attached (step S60). After that, the resultant article is sheathed by the transfer molding process using the epoxy resin (step S70), so that a tantalum solid electrolytic capacitor is completed.

The fabrication method of the tantalum solid electrolytic capacitor according to the present embodiment will now be specifically described hereinbelow on the basis of several examples.

EXAMPLE 1

First, a binder to raise moldability was mixed to powder of metal tantalum, thereby forming granular powder for press molding. Subsequently, a cylindrical compressed article in which the tantalum wire 2 was buried was formed due to a pressing method by using the granular powder. The article was sintered in a vacuum of about $1.33 \times 10^{-4}$ Pa at a temperature of 1300 to 1600° C. to obtain the sintered body 1 (step S10).

Subsequently, the above sintered body 1 was immersed in the aqueous solution of phosphoric acid (forming solution 7) of 0.6 wt % and a formation voltage of 18V was applied between the tantalum wire 2 and the opposite electrode 5 to perform the formation, so that the tantalum oxide film 3 was formed to obtain the formation (step S20).

Next, the above formation was immersed in an aqueous iron salt solution of p-toluene sulfonate of 30 wt % serving as an oxidizer solution for five minutes and then pulled up and dried. After that, thus processed formation was immersed in an ethylenedioxithiophene solution as a monomer of the conducting polymer for a minute and then pulled up and dried, thereby forming the precoating layer 4a as a conducting polymer layer made of polyethylene-dioxithiophene due to the chemically-oxidative polymerization on the tantalum oxide film 3 (step S31).

After that, the formation on which the precoating layer 4a obtained by the chemically-oxidative polymerization was formed was washed with water. Subsequently, in a manner similar to the formation in step S20, it was immersed in the aqueous solution of phosphoric acid and the formation voltage was applied to perform the reformation (step S40). At that time, the aqueous solution of phosphoric acid of 0.002 wt % was used and the formation voltage of 15V was applied for five hours.

Subsequently, in an electrolytic polymerizing solution containing pyrrole of 0.7 mol/L as a conducting polymer monomer, sodium p-toluenesulfonate of 0.3 mol/L as a supporting electrolyte, and sodium dodecylbenzensulfonate of 0.05 mol/L, the element was immersed to form the conducting polymer layer 6 (polypyrrole layer) due to the electrolytic polymerization (step S41). At that time, a feeding terminal made of stainless was come into contact with the precoating layer 4a of the formation, a positive terminal of a DC power source was connected to the feeding terminal made of stainless, a negative terminal was connected to the electrode made of metal arranged so as to be opposite to the element in the electrolytic polymerizing solution, and a voltage was applied. Consequently, the conducting polymer layer 6 (polypyrrole layer) was formed so as to be laminated on the precoating layer 4a.

Subsequently, the formation on which the conducting polymer layer 6 (polypyrrole layer) was formed due to the electrolytic polymerization was washed with water and, after that, it was dried at the temperature over the room temperature, which is generally ranging from 15° C. to 30° C., thereby reducing moisture in (polypyrrole layer) (step S42). The desirable drying temperature is equal to or more than 40° C. In this example, it was dried at 85° C. for two hours. The water content of the precoating layer 4a was also reduced by this drying. The drying reduced the water content contained by 4 wt % at the initial time to half, namely, 2 wt %. In a manner similar to the reformation in step S40, the formation subjected through such a drying process was immersed in the aqueous solution of phosphoric acid and the formation voltage was applied to perform the reformation (step S43). At that time, the aqueous solution of phosphoric acid of 0.002 wt % was used and the formation voltage of 15V was applied for 0.8 hour.

After that, a graphite layer and a silver paste were applied onto the conducting polymer layer 6 (polypyrrole layer) formed due to the electrolytic polymerization in accordance with this order to provide the cathode conductive layer (step S50). The external cathode terminal was fixed to the cathode conductive layer by the conductive adhesive and the external anode terminal was fixed to the tantalum wire 2 by welding, so that the two external terminals of the cathode and the anode were attached (step S60). Thus processed article was sheathed by the transfer molding process using the epoxy resin (step S70), so that the tantalum solid electrolytic capacitor was completed.

EXAMPLE 2

Figure 1:
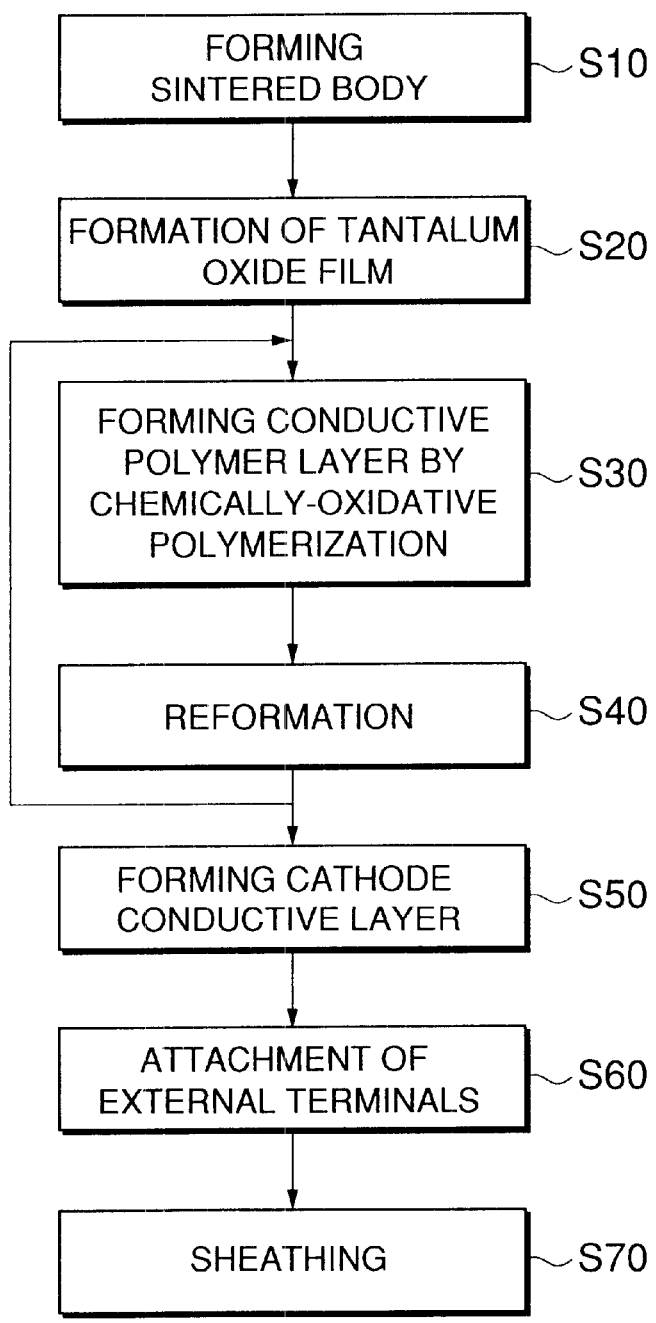
FIG. 1 is a flowchart showing a conventional fabrication process of a tantalum solid electrolytic capacitor comprising a reforming process in accordance with the order of processing steps.
Figure 2A:
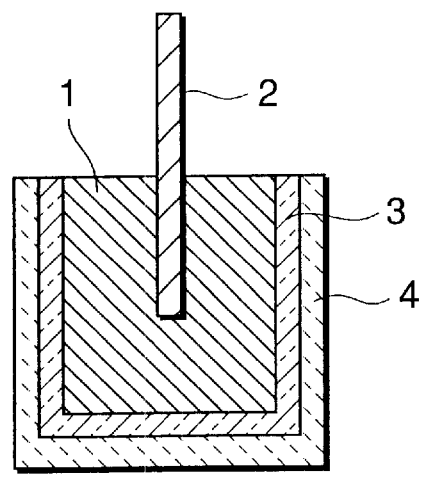
FIG. 2A is a cross-sectional view of a capacitor element at the point of time when processes up to the formation of a conducting polymer layer in the fabrication of the conventional tantalum solid electrolytic capacitor are finished.
Figure 2B:
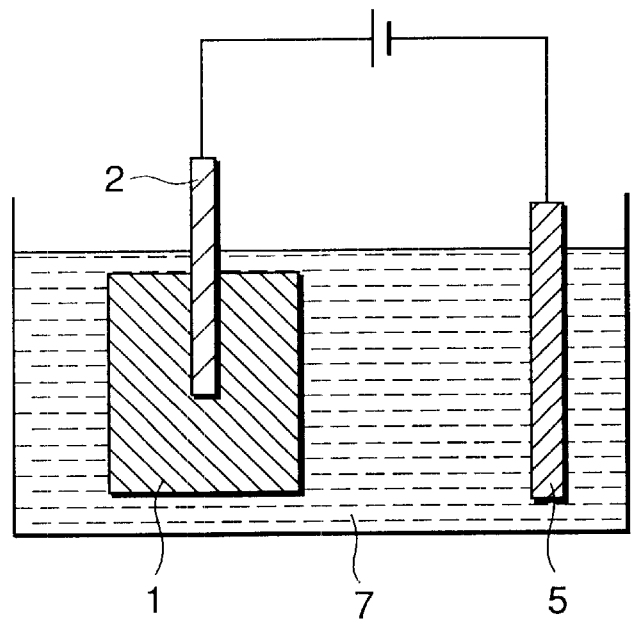
FIG. 2B is a schematic diagram for explaining a method of anodically forming the capacitor element shown in FIG. 2A.
Figure 3:
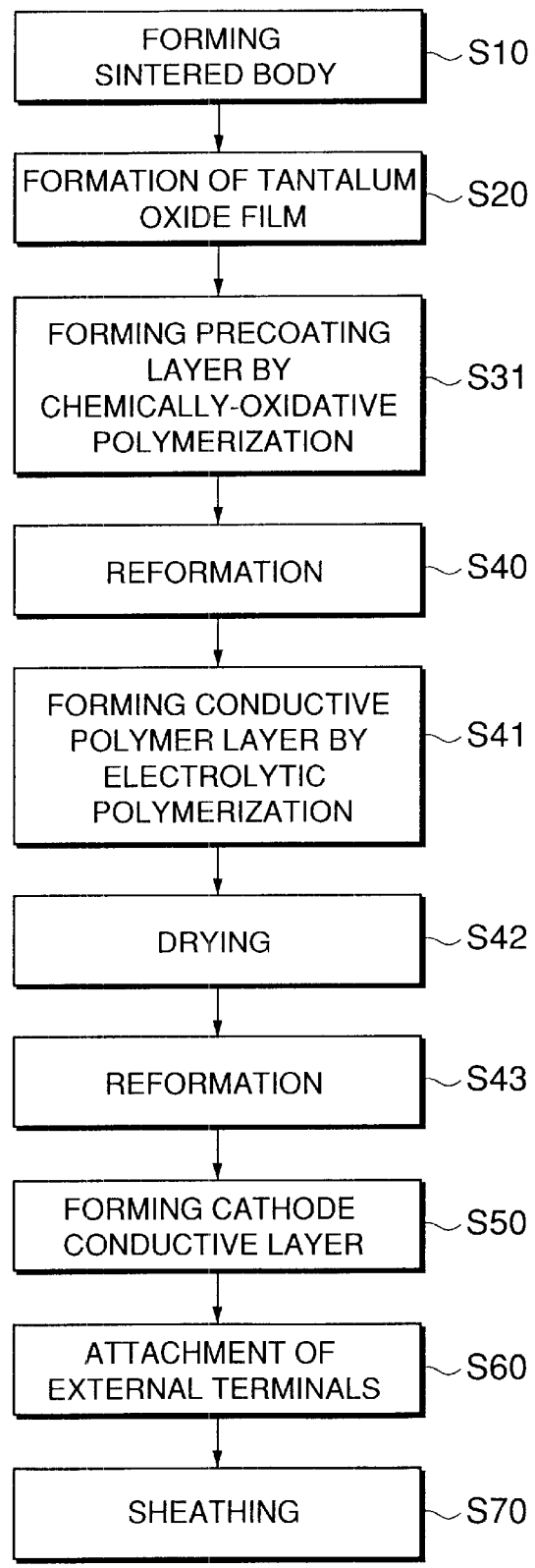
FIG. 3 is a flowchart showing a fabrication process of a tantalum solid electrolytic capacitor according to an embodiment of the invention in accordance with the order of processing steps.

The tantalum solid electrolytic capacitor was fabricated under the same conditions as those of the example 1 other than such a point that in step S42 (drying) in FIG. 3, the water contents of the precoating layer 4a and the conducting polymer layer 6 (polypyrrole layer) were reduced by drying in a room temperature of 15° C. for one hour in a reduced pressure of $1.33 \times 10^{-3}$ Pa. The water content (wt %) of each of the precoating layer 4a and the conducting polymer layer 6 (polypyrrole layer) after the drying in the example 2 was equal to ½ of the initial water content in a manner similar to the example 1.

EXAMPLE 3

Under the same conditions as those of the example 1 other than such a point that in step S42 (drying) in FIG. 3, the water content of the conducting polymer layer was reduced by an air-drying at a room temperature for 24 hours, the tantalum solid electrolytic capacitor was fabricated. The water content (wt %) after the drying in the example 3 was equal to ½ of the initial water content in a manner similar to the example 1.

Subsequently, the tantalum solid electrolytic capacitor was formed on the basis of the following two kinds of comparative examples in each of which the drying process was omitted for comparison.

Comparative Example 1

Under the same conditions as those of the example 1 other than such a point that step S42 in FIG. 3 was omitted, the solid electrolytic capacitor was fabricated. The total water content of the conducting polymer layer 6 and the precoating layer 4a was equal to 4 wt %.

Comparative Example 2

Under the same conditions as those of the example 1 other than such a point that step S40 (the reformation after the formation of the precoating layer) and step S42 (the drying) in FIG. 3 were omitted, the tantalum solid electrolytic capacitor was fabricated. The total water content of the conducting polymer layer 6 and the precoating layer 4a in this case was equal to 4 wt % similar to the comparative example 1.

Subsequently, to compare the characteristics of the capacitors, ten tantalum solid electrolytic capacitors of each of the examples 1 to 3 and the comparative examples 1 and 2 were fabricated. Initial values of an electrostatic capacity C, the equivalent series resistance ESR, and leakage current LC were measured. Mean values of the measured values in respective levels are shown in TABLE 1. The value of each of the ESR and the electrostatic capacity C denotes a value measured at a frequency of 1 kHz and the value of the leakage current LC indicates a value measured after 30 seconds after completion of the application of a DC current of 6.3V. Since the significant differences were not found in the measurement results of the examples 1 to 3, the measurement results of the example 1 are shown as representatives.

TABLE 1

| Sample | Electrostatic Capacity C (µF) | Equivalent Series Resistance ESR (mΩ) | Leakage Current LC (nA) |
| --- | --- | --- | --- |
| Example 1 (Examples 2,3) | 165 | 43 | 527 |
| Comparative Example 1 | 164 | 110 | 544 |
| Comparative Example 2 | 164 | 160 | 617 |

Referring to TABLE 1, although the electrostatic capacity C and the leakage current LC of the examples 1 to 3 are substantially equal to those of the comparative examples 1 and 2, the equivalent series resistance ESR of the examples 1 to 3 is decreased to about ⅓ to ¼ of those of the comparative examples 1 and 2. The reason is considered as follows. That is, in the polyethylenedioxithiophene (precoating layer 4a) obtained by the chemically-oxidative polymerization and the layer of polypyrrole (conducting polymer layer 6) obtained by the electrolytic polymerization, moisture trapped during the polymerization or moisture fetched during water washing is contained. In the case where the reformation is performed in step S43 in FIG. 3, when there is a portion where the leakage current LC is large, during the reformation, occurs a portion where a high electric field is applied to the conducting polymer layer (precoating layer 4a obtained by the chemically-oxidative polymerization) and the polypyrrole layer (conducting polymer layer 6) obtained by the electrolytic polymerization. The conducting polymer corresponding to the portion of the high electric field reacts with a water molecule and an electrochemically-peroxidative reaction is caused, so that the portion becomes an insulator. Simultaneously, the tantalum oxide film is reoxidized to be healed. It seems that the reduction in leakage current LC through the reformation in step S43 is based on the above-mentioned two factors of the partial insulation of the conducting polymer and the reoxidation and healing of the tantalum oxide film. However, the insulation of the conducting polymer results in the decrease of the leakage current LC and, simultaneously, an increase in resistance of the conducting polymer itself. Accordingly, when it is excessively insulated, a deterioration in equivalent series resistance ESR of the capacitor is caused. Consequently, it is considered that while the leakage current LC is being improved in association with the reoxidation and the healing of the tantalum oxide film by properly controlling the water content in the conducting polymer, simultaneously, the rise in equivalent series resistance ESR can be also prevented.

It turns out from the result of TABLE 1 that about 2 wt % is preferable as water content in the conducting polymer layer 6 (including the precoating layer) before the reformation. As a preferred value of the equivalent series resistance ESR, it is equal to or less than 80 mΩ. According to the result of TABLE 1, it is estimated that the water content of the conducting polymer layer 6 (including the precoating layer) before the reformation is equal to or less than 3 wt %. When the water content of the conducting polymer layer 6 (including the precoating layer) before the reformation is excessively lowered, the reoxidative reaction of the tantalum oxide film through the conducting polymer layer 6 is suppressed. Accordingly, it is preferable that the lower limit of the water content in the conducting polymer layer 6 is equal to 0.1 wt %. Therefore, it is preferably considered that the water content of the conducting polymer layer in the drying process is controlled to 0.1 to 3 wt %.

The advantageous effects obtained by preventing the equivalent series resistance ESR in the examples 1 to 3 of the present embodiment from deteriorating are based on the above reasons. Their effects may be obtained irrespective of any polymerizing method, even when the conducting polymer as a solid electrolyte is formed by the chemically-oxidative polymerization or electrolytic polymerization. According to the present invention, however, it is considered that it is more advantageous in the case where the invention is applied to the fabrication of the solid electrolytic capacitor using the conductive polymer due to the electrolytic polymerization. As known well, due to the electrolytic polymerization, a fine conducting polymer with a high density, accordingly, a low resistance can be efficiently obtained for a short time. As the density of the conducting polymer is higher, the forming solution more hardly penetrates upon reformation in step S43. Accordingly, the portion where the reoxidation and healing of the tantalum oxide film 3 are hardly performed, namely, where the leakage current LC is high and a high electric field is applied to the conducting polymer easily occurs. Simultaneously, the moisture contained in the conducting polymer is increased. Because it is considered that in the conducting polymer obtained by the electrolytic polymerization, the deterioration of the equivalent series resistance due to the reoxidation easily occurs by the above-mentioned two factors such as high electric field and high water content.

Although the examples 1 to 3 mentioned above denote the examples in which the present invention is applied to the fabrication of the tantalum solid electrolytic capacitor, the present invention is not limited to it. It can be applied to fabrication of a solid electrolytic capacitor of valve metal other than tantalum, for example, aluminum. The example in which polyethylenedioxithiophene obtained due to the chemically-oxidative polymerization is used as a precoating layer 4a and polypyrrole is used as a conducting polymer layer 6 obtained due to the electrolytic polymerization was shown. The present invention can be also applied to a solid electrolytic capacitor using another conducting polymer.

As mentioned above, according to the present invention, it is possible to provide the solid electrolytic capacitor using the conducting polymer as a solid electrolyte, wherein there is no deterioration of the equivalent series resistance due to the reformation after the formation of the conducting polymer layer. When the present invention is applied to a fabrication method of forming a conducting polymer layer due to the electrolytic polymerization, its benefits are remarkable.

What is claimed is:

1. A fabrication method of a solid electrolytic capacitor, comprising:

subjecting valve metal to an anodic oxidation on a porous surface of said valve metal to form an oxide film;

forming a first conducting polymer layer as a precoating layer on said oxide film by a chemically oxidative polymerization;

anodically reoxidizing said oxide film after forming said precoating layer;

forming a second conducting polymer layer on said precoating layer by electrolytic polymerization;

reducing a water content of said second conducting polymer by a drying process;

anodically reoxidizing said oxide film after reducing said water content of said second conducting polymer layer; and forming a cathode conductive layer on said second conducting polymer layer.

2. The method according to claim 1, wherein said reducing a water content comprises reducing the water content of said conducting polymer layer to half.

3. The method according to claim 1, comprising cleaning said conducting polymer layer with water before said reducing a water content.

4. The method according to claim 1, wherein said reducing a water content comprises heating said conducting polymer layer at a temperature that is higher than a room temperature.

5. The method according to claim 1, wherein said reducing a water content comprises leaving said conducting polymer layer in an atmosphere whose pressure is lower than an atmospheric pressure.

6. The method according to claim 1, wherein said reducing a water content comprises leaving said conducting polymer layer in ambient atmosphere until the water content of the conducting polymer layer is reduced to half.

7. The method according to claim 1, wherein said reducing a water content comprises reducing the water content of said conducting polymer layer to 3 wt % or less.

8. The method according to claim 1, wherein said reducing a water content comprises reducing the water content of said conducting polymer layer to 0.1 to 3 wt %.

9. The method according to claim 1, further comprising after forming said cathode conductive layer on said conducting polymer layer:
    attaching external terminals; and
    sheathing with a resin.

10. A fabrication method of a solid electrolytic capacitor, comprising:
    subjecting valve metal to an anodic oxidation on a porous surface of said valve metal to form an oxide film;
    forming a first conducting polymer layer as a precoating layer on said oxide film by a chemically oxidative polymerization;
    anodically reoxidizing said oxide film after forming said precoating layer;
    forming a second conducting polymer layer on said precoating layer by electrolytic polymerization;
    reducing a water content of said second conducting polymer by a drying process;
    anodically reoxidizing said oxide film after reducing said water content of said second conducting polymer layer; and
    forming a cathode conductive layer on said second conducting polymer layer,
    wherein said reducing a water content comprises reducing the water content of said conducting polymer layer to 3 wt % or less.

11. A fabrication method of a solid electrolytic capacitor, comprising:
    subjecting valve metal to an anodic oxidation on a porous surface of said valve metal to form an oxide film;
    forming a conducting polymer layer on said oxide film;
    drying said conducting polymer layer;
    anodically reoxidizing said oxide film after drying said conductive polymer layer; and
    forming a cathode conductive layer on said conducting polymer layer,
    wherein said reducing a water content comprises setting an equivalent series resistance of said solid electrolytic capacitor to 80 mΩ or less.

* * * * *